Dec. 10, 1968 E. AULHORN 3,415,594
PROJECTION TYPE SIGHT TESTING APPARATUS WITH ADJUSTABLE
LIGHT INTENSITY CONTROL MEANS FOR
VISION TEST CHARACTER
Filed Sept. 18, 1964 2 Sheets-Sheet 2
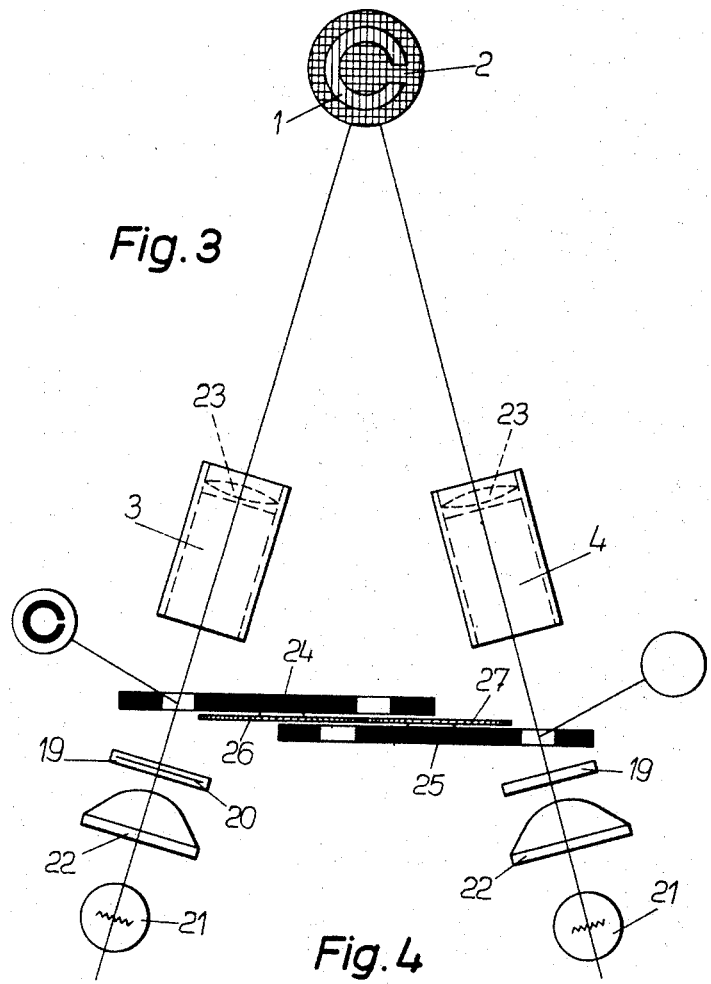
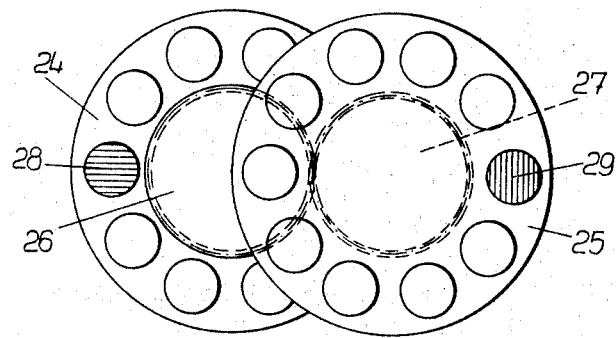
Inventor
Elfriede Aulhorn
Watson Cole Grindle & Watson
Attys.

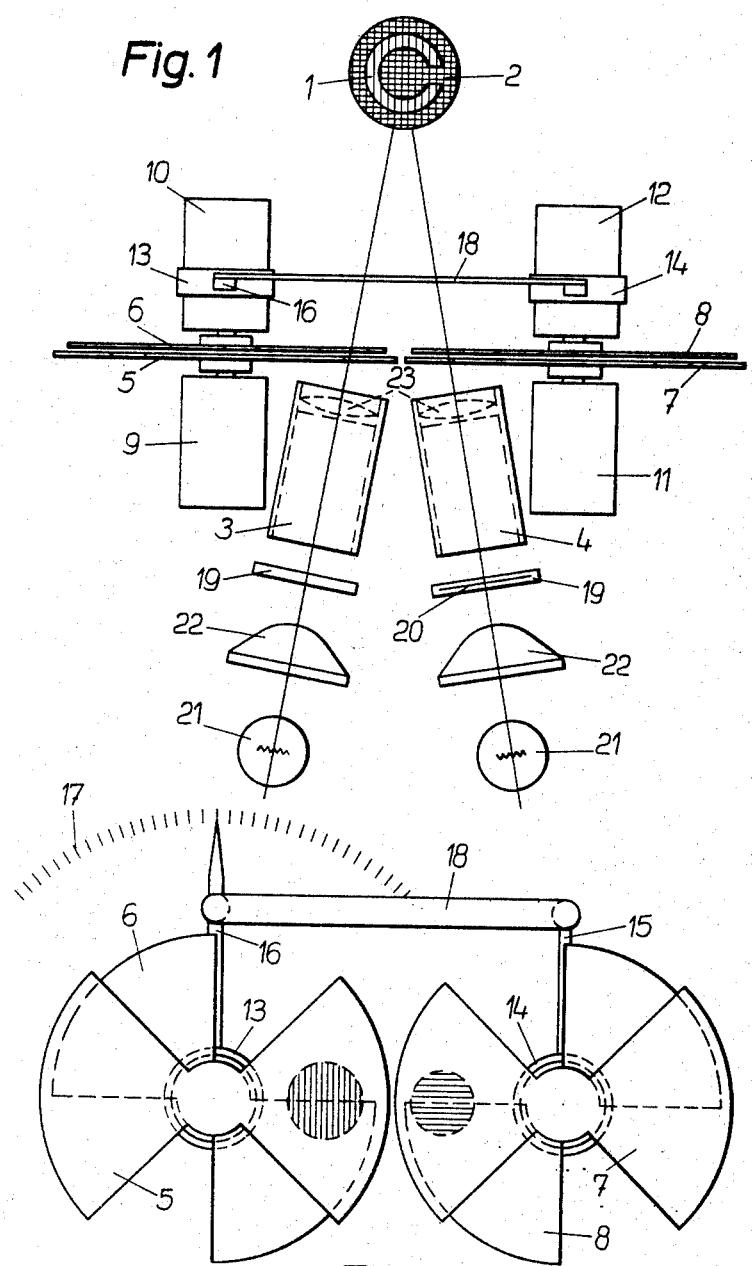

United States Patent Office 3,415,594
Patented Dec. 10, 1968

3,415,594
PROJECTION TYPE SIGHT TESTING APPARATUS WITH ADJUSTABLE LIGHT INTENSITY CONTROL MEANS FOR VISION TEST CHARACTER
Elfriede Aulhorn University Eye Clinic, Tubingen, Germany
Filed Sept. 18, 1964, Ser. No. 397,485
Claims priority, application Germany, Sept. 18, 1963, A 44,082
2 Claims. (Cl. 351—30)

This invention relates to optical apparatus and particularly to sight testing apparatus in which visual signs or test characters are used which appear in the form of optional figures, e.g. as circles, within an illuminated surround, i.e. standing out to a greater or lesser degree from an illuminated area. It was found that reliable measurements can be obtained with such apparatus only if at the brightness of the illuminated area needed for these measurements, there exist certain differences in brightness between the visual sign and the said area.

A main object of the invention is to provide an arrangement which makes it possible, for a specific and constant luminosity of the illuminated area, to set different degrees of brightness of the visual sign and thus varying differences in brightness between the visual sign and the said area.

According to the present invention an apparatus for sight testing comprises for use with a screen or the like a first means operable to produce a beam of light adapted to illuminate on the screen only an area surrounding a sign to be viewed, a second means operable to produce a second beam of light adapted to illuminate on the screen both said sign and said area surrounding the sign, and control means co-operating with said first and second means and operable to effect simultaneous inverse adjustment of the respective intensities of said beams.

In a preferred construction, the control means comprises two pairs of rotatable segmented plates, one pair of plates being disposed in the path of one of said beams, and the other pair of plates being disposed in the path of the other of said beams, four constant speed devices and means for connecting said devices one to each of said plates, said devices being operable to rotate all said plates at the same speed, means operable to couple one device of one pair of plates with one device of the other pair of plates, said coupled devices being operable to vary simultaneously and by equal amounts the angular disposition of one plate of each pair with respect to the remaining plates.

In a further preferred construction the control means comprises two rotatable discs, one of said discs being disposed in the path of one of said beams, and the other disc being disposed in the path of the other of said beams, each of said discs having openings passing therethrough and each opening including an optical filter, said openings being disposed around and adjacent to at least a part of the disc periphery, the transparency of said filters increasing progressively in successive openings, means for interconnecting said discs and effecting rotation thereof simultaneously to increase the intensity of one of said beams and to decrease the intensity of the other of said beams by an equal amount. In this manner, it is assured that the luminous intensity of the illuminated area always remains the same, since the diminution in its luminous intensity caused by reduction of the luminous intensity of the first beam forming means is compensated for by the increase in the luminous intensity of the second beam forming means whereas the luminous intensity of the visual sign itself increases or decreases linearly with that of the corresponding beam forming means. The same also applies if the control action is effected in the opposite sense.

The luminous intensity of the beam forming means may be controlled by means of interchangeable filters for example polarising filters, or of segmented rotatable plates, either of which means are mechanically interlinked in such manner that, for example in the case of the filters a brightening of the one beam results in darkening of the other. In order that the invention may be more fully understood, some embodiments thereof will now be described, by way of example, with reference to the drawings, in which:

FIGURE 1 shows a diagrammatic plan view of an instrument operating with rotatable segmented plates, FIGURE 2 is a diagram showing an arrangement whereby joint control of the luminous intensity of both beam forming means is achieved, FIGURE 3 shows an instrument operating with interchangeable filters in plan view, and FIGURE 4 shows the filters in end view.

A sight testing apparatus using a visual sign 1 on an illuminated area 2 forming the known Landolt ring projected onto a screen (not shown) is diagrammatically shown in FIGURE 1. The first and second beam forming means are shown as two projectors 3 and 4 respectively which serve to illuminate the visual sign and the surrounding area 2, the second projector 3 illuminating both the sign 1 and the surrounding area 2, i.e. the field indicated by vertical lines in the drawing. In the beam of the first projector 4 there is in the shutter 19 a disc 20 having an opaque part corresponding to the sign 1. The projector 4 thus illuminates the surrounding area only, i.e. that part of the sign covered by horizontal lines and indicated by 2 in the drawing. The parts comprising each projector, namely an incandescent bulb, condenser lens and projection lens, are designated 21, 22 and 23 respectively.

Segmented plates arranged in two coaxial pairs 5, 6 and 7, 8 are individually rotatably mounted, one pair in the beam of each projector. Each plate has two diametrically opposed circular segments with an apex angle of 90°. Each of the four plates is fitted on the spindle of a separate synchronous motor, which motors are marked 9 to 12 in the drawing. The cases of the synchronous motors 9 and 11 are rigidly mounted on a bearer which is not shown. The cases of the motors 10 and 12 are rotatably mounted in the same bearer. Rings 13 and 14 are engaged respectively around the cases of motors 10 and 12. The ring 14 carries a lever arm 15 and the ring 13 a lever arm 16, having the form of a pointer and adjustable according to a scale 17. The lever arms 15 and 16 are pivotally connected by a rod 18, i.e. the cases of the two motors may be swivelled jointly through an angle.

The synchronous motors 9 to 12 run at exactly the same speed. The reciprocal angular setting of their rotors however depends on the position of the cases with respect to each other. The cases 9 and 11 have precisely the same fixed position. The cases 10 and 12 also have precisely the same position, but their angular position relative to the cases 9 and 11 is adjustable, in the present instance within an angle of 90°. By displacing the pointer 16, one may thus assure that the segments of the plate 6 cover the gaps between the segments of the plate 5, whereas the segments of the plate 8 wholly uncover the gaps of the segments of the plate 7, or conversely, depending on the direction of displacement of the pointer 16. As previously stated, this ensures that the luminous intensity of the surround remains constant, that of the visual sign increasing or decreasing as desired by varying the luminous intensity of the projectors 3 and 4 as described. Thus any difference in luminous intensity between the visual sign and surrounding area may be set while retaining a constant luminous intensity of the surround.

In the example of embodiment according to FIGURES 3 and 4, identical parts are given the same references as in FIGURES 1 and 2. Two rotatably mounted discs 24 and 25 are disposed one in each of the beams of the projectors 3 and 4, being interlinker by means of gearwheels 26 and 27. If one of the discs is turned manually about its axis, the other disc turns in the opposite direction. Each of the discs 24 and 25 accommodates ten filters 28, 29, the transparency of which progressively increase to the same extent by equal steps around each disc, i.e. their power increases or decreases in steps from a particular filter. The filters are so arranged that the weakest filter 28 co-operates with the strongest filter 29, and vice versa. By turning the discs 24, 25 one may ensure that the luminous intensity of the surrounding area always remains the same, whereas that of the visual sign increases or decreases. In this case, the variation does not occur evenly but in steps, which is adequate however for practical requirements. In the example of the embodiment of FIGURES 3 and 4, the disc 20 is mounted in the shutter 19 of the projector 3.

I claim:

1. Sight testing apparatus for the linear adjustment of the illumination intensity of a visual test character on a screen within an illuminated surrounding area in which the illumination intensity of the test character is varied while the illumination of the surrounding area is held uniform, comprising a pair of duplicate optical projectors to illuminate the same surface of the screen, one of said projectors illuminating both the character and the surrounding area, the other of said projectors having an opaque test character masking element and illuminating only the surrounding area, and control means in the light beams of both projectors and coupled so that the light intensity of one of the beams will intensify as the other beam de-intensifies, said control means comprising two pairs of rotatable segmented plates, one pair of plates being coaxially disposed in the path of one of said beams, and the other pair of plates being coaxially disposed in the path of the other of said beams, four constant speed devices and means for connecting said devices one to each of said plates, said devices being operable to rotate all said plates at the same speed, link means operable to couple one device of one pair of plates with one device of the other pair of plates, said coupled devices being rotatably mounted and operable to vary simultaneously and by equal amounts the angular disposition of one plate of each pair with respect to the other plate of each pair and said constant speed devices being synchronous electric motors.

2. Sight testing apparatus for the linear adjustment of the illumintion intensity of a visual test character on a screen within an illuminated surrounding area in which the illumination intensity of the test character is varied while the illumination of the surrounding area is held uniform, comprising a pair of duplicate optical projectors to illuminate the same surface of the screen, one of said projectors illuminating both the character and the surrounding area, the other of said projectors having an opaque test character masking element and illuminating only the surrounding area, and control means in the light beams of both projectors and coupled so that the light intensity of one of the beams will intensify as the other beam de-intensifies, said control means comprising two rotatable discs, one of said discs being disposed in the path of one of said beams and the other disc being disposed in the path of the other of said beams, each of said discs having a plurality of openings passing therethrough and each opening including an optical filter, said openings being disposed around and adjacent to at least a part of the disc periphery, the transparency of said filters increasing progressively in successive openings, means for interconnecting said discs and effecting rotation thereof simultaneously to increase the intensity of one of said beams and to decrease the intensity of the other of said beams by an equal amount and said discs interconnecting means comprising meshing toothed wheels.

References Cited

UNITED STATES PATENTS

| | | | |
|---|---|---|---|
| 1,795,752 | 3/1931 | Bauersfeld et al. | 351—30 |
| 2,166,947 | 7/1939 | Fayerweather | 88—108 X |
| 2,184,507 | 12/1939 | Jobe | 351—30 |
| 2,217,236 | 10/1940 | Schafer | 88—23 |
| 2,328,239 | 8/1943 | Wengel | 88—26 |

DAVID H. RUBIN, *Primary Examiner.*

U.S. Cl. X.R.

351—36; 88—26